M. B. CARMODY.
VEHICLE WHEEL TIRE.
APPLICATION FILED JULY 10, 1909. RENEWED OCT. 28, 1910.
993,957.
Patented May 30, 1911.
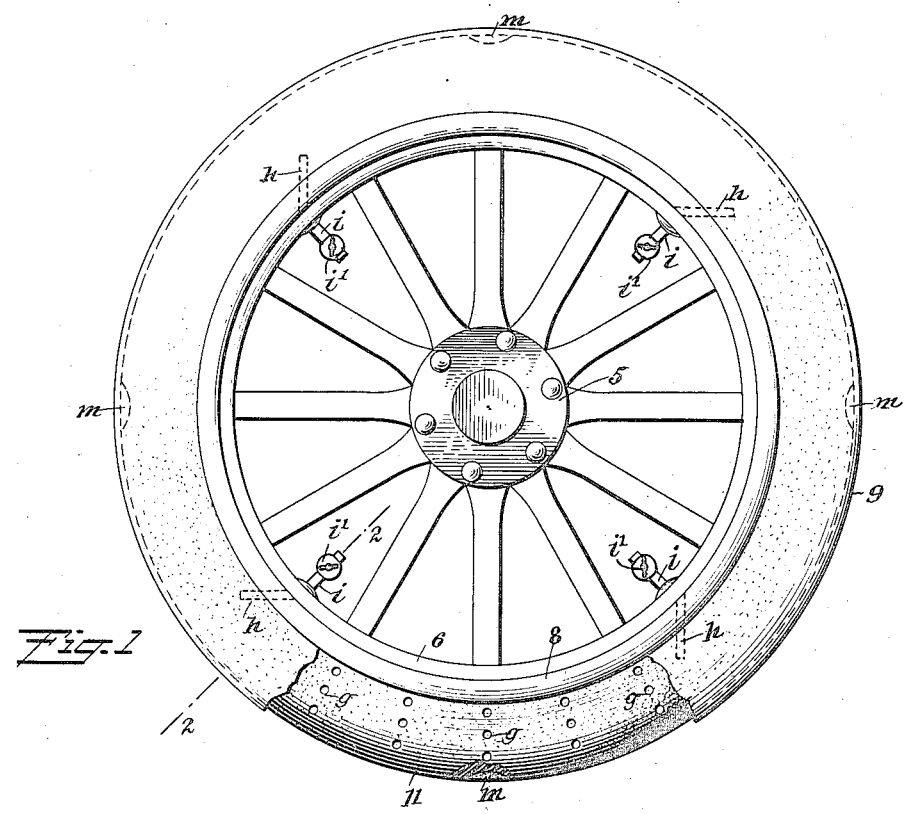
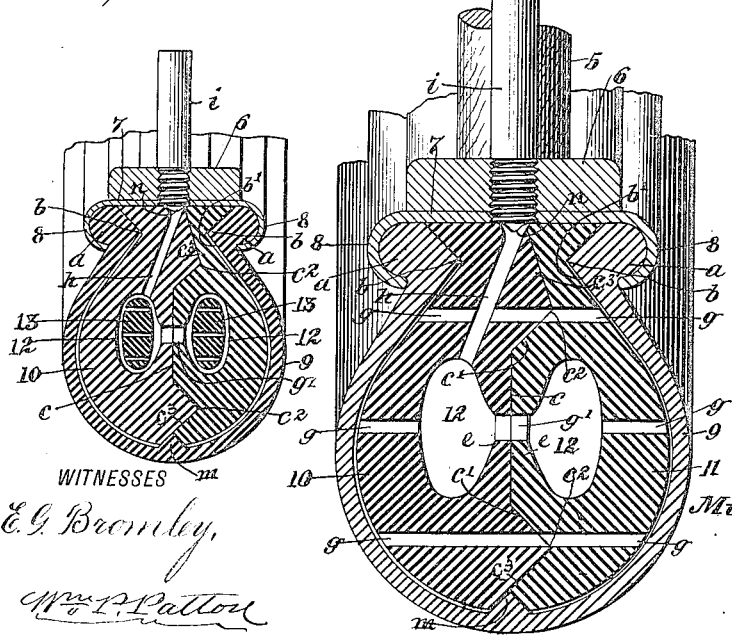
WITNESSES
E. G. Bromley
Wm. P. Patton
INVENTOR
Michael B. Carmody
BY Munn & Co
ATTORNEYS

UNITED STATES PATENT OFFICE.

MICHAEL BUCK CARMODY, OF COLUMBUS, OHIO.

VEHICLE-WHEEL TIRE.

993,957.            Specification of Letters Patent.     Patented May 30, 1911.

Application filed July 10, 1909, Serial No. 506,869. Renewed October 28, 1910. Serial No. 589,592.

*To all whom it may concern:*

Be it known that I, MICHAEL B. CARMODY, a citizen of the United States, and a resident of Columbus, in the county of Franklin and State of Ohio, have invented a new and Improved Vehicle-Wheel Tire, of which the following is a full, clear, and exact description.

This invention relates to a class of vehicle tires having a tubular expansible body, that is attachable to the rim of a vehicle wheel, and interior elastic distending means, which afford support to the body.

The purpose of my invention is to provide a vehicle wheel tire of the class indicated, which embodies novel details, that are simple, durable, afford interior ventilation and elastic support to the body of the tire, and which permit a quick and convenient detachment of the exterior of the body of the tire from the wheel rim, as well as the removal of said novel details from the tire body if occasion requires.

The invention consists in the novel construction and combination of parts, as is hereinafter described and defined in the appended claims.

Reference is to be had to the accompanying drawings forming a part of this specification, in which similar characters of reference indicate corresponding parts in all the views, and in which—

Figure 1 is a side view of a vehicle wheel and of the improved tire mounted thereon, a portion of the tubulate body of said tire being removed, exposing novel details; Fig. 2 is an enlarged transverse sectional view substantially on the line 2—2 in Fig. 1; and Fig. 3 is a transverse sectional view of the improvement, showing an additional feature of the invention.

In the drawings, 5 indicates a vehicle wheel of a type which receives an elastic tire, and 6, a wheel felly that has a true cylindrical periphery, whereon is secured a clencher rim 7, said rim at each side thereof having a semi-circular clamping member 8, of well-known construction.

The tire proper consists of an open tubulated ring 9 formed of suitable material having a proper degree of elasticity. Upon the outer side of the tire body 9, at the edges thereof that define the slot-like opening therein, a semi-circular rib is formed on each edge that projects outwardly, as shown at $a$, $a$, in Figs. 1 and 3. Opposite the ribs $a$, $a$, on the inner side of the tire body 9, two similar angular ribs $b$, $b$ are respectively formed. The elastic core that fills the tire body 9, is in two half sections 10, 11, that are each in continuous ring form. One half section 10 for the core is formed with an annular recess $c$, in the side that has contact with the half section 11, said recess having a flat bottom, and two oppositely inclined sides $c'$ $c'$. The flaring sides $c'$ $c'$ of the recess $c$ are of an equal height, and at their upper edges $c^2$ $c^2$ meet two outwardly and downwardly inclined sides $c^3$ $c^3$ on the section 10, which sides $c^3$ $c^3$ extend respectively to the upper and lower surface of the said half section 10; and it will be seen that the junction of each pair of inclined sides $c'$ $c^3$ produces an angular transversely disposed projection, the apex of which is at $c^2$. The inner side surface on the core section 11 that engages the corresponding surface on the section 10, and which has been described, is shaped to conform thereto, and thus adapt these meeting sides of the two half sections 10, 11 to have close contact throughout their areas, as is clearly shown in Figs. 2 and 3. The outer surface of the half sections 10, 11 are rounded, so that they together fit closely within and have intimate contact with the inner surface of the tire body 9, when said half sections of the core ring are inserted therein.

As shown in Figs. 2 and 3, the inclined surface $b'$ of each angular rib $b$ on the inner side of the tire body 9 which is farthest from the upper surface of each half section 10, 11, slopes downward and toward the concave inner surface of said tire body, into which said sloping surfaces merge.

In the outer face of each half section 10, 11, an angular recess is formed that receives a corresponding angular rib $b$ when the two-part core body is fully inserted within the hollow tire body 9.

Near the center of each core section 10, 11, an annular continuous air chamber 12 is formed therein, said chambers being of an equal size and oval in cross section, but on their sides that are nearest to each other being rendered obtuse angular, thus reducing the thickness of the walls $e$, that separate the core sections at their centers. In tires that are subjected to great load strain, the chambers 12, may each be filled loosely by the insertion thereinto of a sectional filling ring 13, said rings being elastic and transversely perforated at intervals as shown in Fig. 3.

A plurality of transverse air passages g are formed in the core half sections 10, 11, that register with each other in pairs, and an air passage g' is formed in the dividing walls between the core sections, which connects the chambers 12, two of the air passages g extending laterally from said chambers. At suitable points, preferably equally distant from each other, similar air ducts h are formed in the core section 10, said ducts extending from the air chamber 12 through the wall of said core section that is adjacent to the clencher rim 7. Opposite each air duct h an air-controlling short tube i is inserted through and secured in the wheel-felly 6 and clencher rim 7, the passages in each of said tubes being controlled by a valve i', whereby the inflow and escape of air into and from the interior of the core rings 10, 11 may be graduated by an adjustment of said valves. A circumferential groove n is formed in the inner surface of the tire section 10, at a point which adapts the air ducts h and tubes i to communicate therewith, and thus facilitate a free circulation of air in the sections 10 and 11.

In the inner surface of the tubulated tire body 9, at suitable points, inwardly-projecting short studs m are formed, that are seated in correspondingly-shaped sockets in the core sections 10, 11, the interlocking engagement of the studs and sockets preventing the core sections from creeping within the tire ring 9.

The angular formations on the inner sides of the core rings 10, 11, prevent one section from shifting on the other one, and the engagement of the angular ribs b within the V-shaped recesses in the core half sections 10, 11 serves to lock the tire body 9 upon the core half sections, while the convexed ribs a, a are interlocked with the clenching rim 7.

It will be noted that the free circulation of air throughout the interior of the tire body, prevents excessive heat therein which causes decay and loss of proper elasticity.

When it is essential that the tire and its core be charged with confined air, that will reduce the degree of elasticity, the valves i' may be closed, which will retain the air in the tire, and adapt it to sustain a greater load, without flattening the engaged peripheral surface of the same.

Having thus described my invention, I claim as new, and desire to secure by Letters Patent:—

1. A vehicle tire, embodying a tubulated body open at one side, and an elastic core ring formed in two sections that laterally have contact with each other, and fill the tubulated body, said core sections having communicating air chambers and provided with air passages leading from said chambers out through the sides of the said sections.

2. A vehicle tire, embodying a tubulated body, open at one side, the edges defining said opening each having an annular V-shaped rib thereon, and an elastic core ring formed in two half sections, said sections having interlocking engagement with each other and each provided with a V-shaped recess to receive the ribs of the body.

3. A vehicle tire, embodying a tubulated body open at one side, the edges defining said opening each having an annular convexed rib on the outer side, and an annular V-shaped rib opposite the convexed rib, and an elastic core ring in two half sections, having corresponding interlocked angular projections and recesses on and in their impinging sides, and also having angular recesses in their outer sides wherein the V-shaped ribs are embedded.

4. A vehicle tire, embodying a tubulated body open at one side, the defining edges of the opening each having a V-shaped rib on the inner side thereof, an elastic core ring in two half sections, having V-shaped recesses that interlock with the V-shaped ribs, said sections having transverse air passages therethrough.

5. A vehicle tire, embodying a tubulated body open at one side, means for securing the tire body on a wheel rim, a core ring in two half sections, means for interlocking the sides of said sections that impinge upon each other, said core sections each having an annular chamber therein, and air ducts leading into said chambers.

6. A vehicle tire, embodying a tubulated body open at one side, a core ring in two half sections, means for interlocking the sides of said sections that impinge upon each other, said sections each having an annular chamber therein, intersected by transverse air passages, and further provided with air ducts that extend from one chamber outwardly, and means for controlling air that traverses said ducts.

7. A vehicle tire, embodying a tubulated body open at one side, a core ring in two half sections, means for interlocking the sides of said sections that have contact, means for interlocking the body and the core sections near the defining edges of the opening in said body, each core section having an annular chamber therein, and an annular filling ring in each chamber.

8. The combination with a vehicle wheel rim, and a clencher rim thereon, of an elastic tire, comprising a tubulated body having an open side, means for interlocking the edge portions of the body with the clencher rim, a two part core ring occupying the tubulated body, and interlocked together at adjacent sides thereof, air passages in the core ring, an annular chamber in each part of the core ring, air ducts leading from the outside of the core ring into said ring, and valves controlling air passing through the ducts.

9. In a vehicle tire of the character described, a tubulated tire body open at one side, a two part core ring occupying the tubulated body and interlocked together, and projections on the inner surface of the tire body which are embedded in sockets formed in the core sections for preventing said sections from creeping in the tubulated tire body.

In testimony whereof I have signed my name to this specification in the presence of two subscribing witnesses.

MICHAEL BUCK CARMODY.

Witnesses:
 WILL HEADLER,
 GRACE GILBERT.